United States Patent
Gouerec et al.

(10) Patent No.: US 10,774,232 B2
(45) Date of Patent: Sep. 15, 2020

(54) WAX-BASED COLORING CRAYON WITH A WATERCOLOR EFFECT

(71) Applicant: SOCIETE BIC, Clichy (FR)

(72) Inventors: Julien Gouerec, Boulogne-sur-mer (FR); Alice Danel, Rinxent (FR); Philippe Lefebvre, Wimereux (FR)

(73) Assignee: SOCIETE BIC, Clichy (FR)

( * ) Notice: Subject to any disclaimer, the term of this patent is extended or adjusted under 35 U.S.C. 154(b) by 95 days.

(21) Appl. No.: 16/075,807

(22) PCT Filed: Feb. 2, 2017

(86) PCT No.: PCT/FR2017/050230
§ 371 (c)(1),
(2) Date: Aug. 6, 2018

(87) PCT Pub. No.: WO2017/134389
PCT Pub. Date: Aug. 10, 2017

(65) Prior Publication Data
US 2019/0048220 A1 Feb. 14, 2019

(30) Foreign Application Priority Data
Feb. 5, 2016 (FR) ...................... 16 50957

(51) Int. Cl.
| | |
|---|---|
| *C09D 13/00* | (2006.01) |
| *B43K 19/00* | (2006.01) |
| *C08K 3/013* | (2018.01) |
| *C08K 3/34* | (2006.01) |
| *C08K 5/00* | (2006.01) |
| *C08K 5/06* | (2006.01) |
| *C08K 5/11* | (2006.01) |
| *C08L 91/06* | (2006.01) |

(52) U.S. Cl.
CPC ............ *C09D 13/00* (2013.01); *B43K 19/003* (2013.01); *C08K 3/013* (2018.01); *C08K 3/346* (2013.01); *C08K 5/0041* (2013.01); *C08K 5/06* (2013.01); *C08K 5/11* (2013.01); *C08L 91/06* (2013.01)

(58) Field of Classification Search
CPC ....................................................... C09D 13/00
See application file for complete search history.

(56) References Cited

U.S. PATENT DOCUMENTS

| | | | | |
|---|---|---|---|---|
| 5,084,098 A | * | 1/1992 | Olson ................. | C09D 13/00 106/31.09 |
| 5,084,493 A | * | 1/1992 | Olson ................. | C09D 13/00 401/49 |
| 6,039,797 A | * | 3/2000 | Fistner, Sr. ........ | C09D 13/00 106/31.09 |
| 9,988,546 B2 | * | 6/2018 | Claptien ............. | B43K 19/18 |
| 2007/0043109 A1 | * | 2/2007 | Linter ................ | A61K 8/4973 514/468 |
| 2011/0277661 A1 | * | 11/2011 | Murphy .............. | C09D 13/00 106/31.01 |
| 2015/0376433 A1 | * | 12/2015 | Tozuka .............. | C09D 13/00 15/427 |
| 2016/0075904 A1 | * | 3/2016 | Tozuka .............. | C09D 11/17 524/57 |
| 2018/0112095 A1 | * | 4/2018 | Falken ............... | C08L 67/02 |

FOREIGN PATENT DOCUMENTS

| | | |
|---|---|---|
| EP | 0434163 A1 | 6/1991 |
| RO | 95221 A2 | 9/1988 |
| RO | 96376 A2 | 2/1989 |
| SU | 960214 A1 | 9/1982 |

OTHER PUBLICATIONS

International Search Report dated Mar. 30, 2017 from corresponding International PCT Application No. PCT/FR2017/050230, 5 pages.

* cited by examiner

*Primary Examiner* — Helene Klemanski
(74) *Attorney, Agent, or Firm* — Ohlandt, Greeley, Ruggiero & Perle, L.L.P.

(57) ABSTRACT

A wax-based coloring crayon for a porous surface and for a non-porous surface includes at least one wax, an ethoxylated fatty alcohol, stearin, a filler, at least one pigment, and optionally an additive.

20 Claims, No Drawings

WAX-BASED COLORING CRAYON WITH A WATERCOLOR EFFECT

CROSS REFERENCE TO RELATED APPLICATIONS

This application is a national stage application, filed under 35 U.S.C. § 371, of International Patent Application No. PCT/FR2017/050230, filed on Feb. 2, 2017, which is incorporated by reference herein in its entirety.

BACKGROUND

1. Field

The present invention relates to wax-based coloring crayons for use on surfaces that are porous or non-porous.

2. Description of Related Art

Wax-based coloring crayons are already known in the prior art. Such crayons, also known as wax crayons or wax pastels, are similar in size to chalk sticks for writing on blackboards, but differ because of the presence of fat, in particular at a high proportion, e.g. in the form of wax. This fat serves as a basis for the crayon, and during fabrication it is melted prior to incorporating other ingredients. Wax-based crayons are generally used for coloring on paper. Nevertheless, they are not suitable for use as the "lead" in a color pencil since their mechanical properties are suitable for enabling them to be used on their own without requiring the presence of a sheath, and thus without breaking in use. Such crayons are likewise not generally intended for use on the skin, even though they are not toxic. The problem encountered with such crayons is that they are for use on only one type of medium, namely porous surfaces like paper, and they are difficult to erase, in particular on skin or clothing, because of the presence of wax in the material, which leads to a residue after washing. On non-porous surfaces they are also difficult to erase, in particular to dry erase.

SUMMARY

The inventors have observed that by replacing a portion of the wax with an ethoxylated fatty alcohol, it is possible to obtain a wax-based coloring crayon that can be used on non-porous surfaces, that is washable in water and dry erasable when on such surfaces, and that presents a watercolor effect on porous surfaces such as paper. Furthermore, cleaning such crayons from the skin is easy, and likewise, clothing soiled by such wax presents good washing properties.

Application EP 0 434 163 discloses using an ethoxylated fatty alcohol in water washable crayons. Nevertheless, those crayons are not wax-based crayons since the purpose of that application is to obtain a crayon having few ingredients and thus essentially containing ethoxylated fatty alcohol and coloring agents. In addition, such crayons present the following drawbacks:

they are too sticky on paper, too greasy, and they lack slipperiness;
they form a deposit of non-uniform thickness since the crayon tends to become crushed on the paper;
they present little breaking strength or resistance to impacts;
they leave the hands very messy (even if they are easily washable in water); and
they are difficult to prepare: they do not shrink, so they are difficult to unmold, and their cooling time is excessive.

DETAILED DISCLOSURE

The present invention thus provides a wax-based coloring crayon for a porous surface and for a non-porous surface, the crayon comprising:
a) at least one wax;
b) an ethoxylated fatty alcohol;
c) stearin;
d) a filler;
e) at least one pigment; and
f) optionally an additive.

The composition of the wax-based coloring crayon of the present invention thus comprises a wax a) that constitutes the matrix of the crayon and provides it with its structure and mechanical properties.

Advantageously, the wax a) is a natural wax (of vegetable, animal, or insect origin) or a synthetic wax, or a mixture of such waxes. In particular, the wax is selected from paraffin, monocrystalline wax, beeswax, polyethylene wax, pentaerythritol stearate, and mixtures thereof, more advantageously from paraffin, monocrystalline wax, beeswax, and mixtures thereof, still more advantageously from a mixture of paraffin and monocrystalline wax, and a mixture of beeswax and monocrystalline wax.

In an advantageous embodiment, the content of wax a) in the wax-based coloring crayon of the present invention lies in the range 5% to 75% by weight, advantageously in the range 10% to 50% by weight, still more advantageously in the range 15% to 35% by weight, in particular in the range 20% to 30% by weight, relative to the total weight of the crayon.

When the wax a) comprises monocrystalline wax, the content of monocrystalline wax in the crayon of the invention lies in the range 5% to 25% by weight, in particular in the range 6% to 15% by weight, more advantageously in the range 7% to 14% by weight, relative to the total weight of the crayon.

When the wax a) comprises paraffin, the content of paraffin in the crayon of the invention lies in the range 5% to 40% by weight, in particular in the range 10% to 25% by weight, more advantageously in the range to 20% by weight, relative to the total weight of the crayon.

When the wax a) comprises beeswax, the content of beeswax in the crayon of the invention lies in the range 5% to 40% by weight, in particular in the range 10% to 25% by weight, more advantageously in the range 11% to 15% by weight, relative to the total weight of the crayon.

The composition of the wax-based coloring crayon of the present invention further comprises an ethoxylated fatty alcohol b). The ethoxylated fatty alcohol serves to provide the crayon of the invention with the property of being water-soluble, while maintaining good affinity with the wax a).

Advantageously, the ethoxylated fatty alcohol is a $C_{12-22}$ fatty alcohol, and more particularly a $C_{16-18}$ fatty alcohol. More advantageously, the ethoxylated fatty alcohol b) is selected from ethoxylated cetyl alcohols, ethoxylated stearyl alcohols, ethoxylated cetyl and stearyl alcohols, and mixtures thereof, and advantageously it is an ethoxylated cetyl and stearyl alcohol having the following formula I:

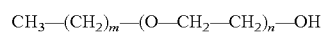

$$CH_3-(CH_2)_m-(O-CH_2-CH_2)_n-OH$$

in which m=15 or 17, and n represents an integer in the range 2 to 100, advantageously in the range 24 to 51, more advantageously in the range 24 to 30.

In particular, the ethoxylated fatty alcohol is ceteareth-25 or ceteareth-50, e.g. sold by the supplier Lamberti under the name Rolfor HT/25 or Rolfor HT/50, in particular ceteareth-25, e.g. sold by the supplier Lamberti under the name Rolfor HT/25.

In an advantageous embodiment, the content of ethoxylated fatty alcohol b) in the crayon of the invention lies in the range 20% to 70% by weight, advantageously in the range 25% to 50% by weight, still more advantageously in the range 25% to 45% by weight, relative to the total weight of the crayon.

The composition of the wax-based coloring crayon of the present invention also comprises stearin c) for the purpose of making the crayon of the present invention slippery.

In an advantageous embodiment, content of stearin c) in the crayon of the present invention lies in the range 10% to 40% by weight, advantageously in the range 15% to 30% by weight, still more advantageously in the range 17% to 25% by weight, relative to the total weight of the crayon.

The composition of the wax-based coloring crayon of the present invention also comprises a dilution filler d).

Advantageously, the filler d) is selected from the group constituted by a clay, kaolin, montmorillonite, bentonite, silica, mica, talc, calcium carbonate, magnesium silicate, aluminum silicate, and mixtures thereof, and advantageously it is kaolin. In particular, the kaolin suitable for use in the invention comprises at least 99% of particles having a diameter of less than 40 micrometers (µm), advantageously at least 97% of particles having a diameter of less than 20 µm, more advantageously at least 86% of particles having a diameter of less than 10 µm, even more advantageously at least 67% of particles having a diameter of less than 5 µm, still more advantageously at least 40% of particles having a diameter of less than 2 µm, as measured using an X-ray sedimentation particle size analyzer. More particularly, kaolin in the invention has a BET specific surface area of 11 square meters per gram ($m^2/g$). Still more particularly, it comprises $Al_2O_3$ (e.g. 35.4%), $SiO_2$ (e.g. 49.1%), $K_2O$ (e.g. 2.1%), $Fe_2O_3$ (e.g. 0.85%), MgO (e.g. 0.28%), $TiO_2$ (e.g. 0.1%), $Na_2O$ (e.g. 0.04%), and/or CaO (e.g. 0.05%). In an advantageous embodiment, the content of filler d) in the crayon of the invention lies in the range 5% to 40% by weight, advantageously in the range 10% to 20% by weight, in particular in the range 14% to 17% by weight, relative to the total weight of the crayon.

The composition of the wax-based coloring crayon of the present invention finally comprises a pigment e) for providing color to the crayon and the marking performed using said crayon.

The pigments are well known to the person skilled in the art depending on the color that is desired, e.g. mineral pigments such as red iron oxide, titanium dioxide, ultramarine, and/or carbon black, and/or organic pigments such as Phthalocyanine Blue (Blue 15:1, 15:3), Yellow 14, Lake Red, Orange 64, Purple 23, and/or Green 7, etc. . . .

In an advantageous embodiment, the content of pigment e) in the crayon of the invention lies in the range 2% to 10% by weight, advantageously in the range 2.5% to 5% by weight, relative to the total weight of the crayon.

The composition of the wax-based coloring crayon of the present invention may comprise an additive f) in order to provide the crayon with additional properties. For example, it may be a plasticizer, such as a phthalate, an epoxy, or an oil, a fragrance, an aroma, a glittering or sparkling ingredient (e.g. absorbing or reflecting light), a preservative, a stabilizer, a dispersant, an anti-foaming agent. By way of example, the additive may be a branched alpha olefin.

In an advantageous embodiment, the content of additive f) in the crayon of the present invention lies in the range 0% to 6% by weight relative to the total weight of the crayon. If an additive f) is present, then its content advantageously lies in the range 1% to 6% by weight relative to the total weight of the crayon.

Advantageously, the crayon of the present invention includes neither ethoxylated sorbitan fatty acid ester nor polyethylene glycol.

The wax-based coloring crayon of the present invention may be used for marking, writing, or drawing by adults or by children on a surface that is porous, such as paper, wood, or card, and also on a surface that is not porous, in particular a surface that is smooth, such as for example a Velleda® type whiteboard, a plastics surface (preferably smooth), a metal surface, or even possibly glass. With non-porous surfaces, the marking is generally temporary since it is easily erasable.

The crayon is fabricated by methods well known to the person skilled in the art for fabricating wax-based coloring crayons. It may comprise a method of casting with molding in recesses (which are then cooled so that the crayons solidify and can be ejected). The fabrication method may thus comprise the step of heating the wax a) to a temperature higher than its melting temperature (generally the melting temperature of the wax a) lies in the range 50° C.-60° C., so the heating step is performed at a temperature of at least 80° C. in order to guarantee complete melting and considerable fluidity, thereby making it easier to fill the mold recesses), adding the other components of the composition (b), c), d), e), and optionally f)) into the molten wax and mixing them, followed by casting the mixture into molds (advantageously in to the recesses of the molds) prior to cooling the molds and solidifying them.

The resulting wax-based coloring crayons present at least one of the following characteristics, and preferably all of the following characteristics:

a watercolor effect (i.e. dissolution of all or part of the binder, enabling the deposit to be spread on the porous surface so as to obtain a "wash" that is "transparent" and no longer 3.5 opaque) on a porous surface such as paper, e.g. using a paint brush or even a finger;

dry erasable when on a surface that is not porous, and in particular a smooth surfaces, such as a Velleda® type whiteboard (in particular there is no need to press hard in order to erase the crayon);

erasable in water (e.g. with a damp cloth) on a non-porous surface, in particular a smooth surface, such as a Velleda® type whiteboard;

good washability when on clothing, in particular in a washing machine; and easy to clean off the skin, in particular using cold water without soap.

In addition, the crayon of the present invention does not present a disagreeable odor, and in particular it presents no odor.

The present invention can be better understood on reading the following examples that are given by way of non-limiting indication.

Example 1: Examples of Compositions for Wax-Based Coloring Crayons of the Present Invention The exact compositions for green-color crayons of the present invention are summarized in Table 1 below:

TABLE 1

| | INGREDIENTS | Example 1 (%) | Example 2 (%) | Example 3 (%) | Example 4 (%) | Example 5 (%) |
|---|---|---|---|---|---|---|
| Wax base | Paraffin | 12.00 | | 15.00 | 12.00 | |
| | Beeswax | | 12.00 | | | 12.00 |
| | Monocrystalline wax | 10.00 | 10.00 | 13.50 | 10.00 | 10.00 |
| | Stearin (of vegetable origin) | 20.00 | 20.00 | 23.50 | 20.00 | 20.00 |
| | Hyper-branch polymer (alpha olefin) | | 5.00 | | | |
| | Ethoxylated fatty alcohol (ROLFOR HT 25) | 40.00 | 35.00 | 30.00 | | |
| | Ethoxylated fatty alcohol (ROLFOR HT 50) | | | | 40.00 | 40.00 |
| | Total wax | 82.00 | 82.00 | 82.00 | 82.00 | 82.00 |
| Pigments | Kaolin (China clay) | 15.00 | 15.00 | 15.00 | 15.00 | 15.00 |
| | Blue 15:3 | 0.39 | 0.39 | 0.39 | 0.39 | 0.39 |
| | Titanium dioxide | 0.74 | 0.74 | 0.74 | 0.74 | 0.74 |
| | Yellow 14 | 1.87 | 1.87 | 1.87 | 1.87 | 1.87 |
| | | 100.00 | 100.00 | 100.00 | 100.00 | 100.00 |

Crayons of red, yellow, orange, cyclamen, and blue color of the invention have also been prepared on the basis of the composition of Example 3, changing only the type of pigments used. All colors can be reached by appropriately selecting the pigment(s) in the mixture.

The resulting crayons all have the following characteristics:
- watercolor effect on paper using a paint brush;
- dry erasable on a Velleda® type whiteboard;
- erasable with a damped cloth on a Velleda® type whiteboard;
- good washability on clothing in a washing machine; and
- easy to clean off the skin using cold water without soap.

Example 2: Comparative Example of Compositions for Wax-Based Coloring Crayons

The exact composition of a green color crayon using ethoxylated stearic acid instead of an ethoxylated fatty alcohol is given in Table 2 below:

TABLE 2

| | INGREDIENTS | Comparative example 1 (%) |
|---|---|---|
| Wax base | Paraffin | 12.00 |
| | Monocrystalline wax | 10.00 |
| | Stearin (of vegetable origin) | 20.00 |
| | Polyoxyethylene stearate (Rolfat ST 100) | 40.00 |
| | Total wax | 82.00 |
| Pigments | Kaolin (China clay) | 15.00 |
| | Blue 15:3 | 0.39 |
| | Titanium dioxide | 0.74 |
| | Yellow 14 | 1.87 |
| | | 100.00 |

The resulting crayon was not dry erasable from a non-porous surface such as a Velleda® type whiteboard and it presented a watercolor effect on paper that was not as good. In addition, in terms of the fabrication method, the resulting mixture is difficult to cast into the mold since it is viscous and not very slippery.

Thus, only ethoxylated fatty alcohols make it possible to give crayons of the invention all of their advantages, both on a porous surface and on a non-porous surface.

The invention claimed is:

1. A wax-based coloring crayon for marking a porous surface and for a non-porous surface, the crayon comprising:
   a) at least one wax;
   b) an ethoxylated fatty alcohol;
   c) stearin;
   d) a filler; and
   e) at least one pigment,
   wherein the marking is dry erasable from the non-porous surface.

2. The coloring crayon according to claim 1, wherein the at least one wax has at least one wax selected from the group consisting of: paraffin, monocrystalline wax, beeswax, polyethylene wax, pentaerythritol stearate, and mixtures thereof.

3. The coloring crayon according to claim 1, wherein the at least one wax is present in an amount that is in a range of 5% to 75% by weight, relative to the total weight of the crayon.

4. The coloring crayon according to claim 1, wherein the ethoxylated fatty alcohol is at least one alcohol selected from the group consisting of: ethoxylated cetyl alcohols, ethoxylated stearyl alcohols, ethoxylated cetyl and stearyl alcohols, and mixtures thereof.

5. The coloring crayon according to claim 1, wherein the crayon has an amount of ethoxylated fatty alcohol that is in a range or 20% to 70% by weight, relative to the total weight of the crayon.

6. The coloring crayon according to claim 1, wherein the crayon has an amount of stearin that is in a range of 30% to 40% by weight, relative to the total weight of the crayon.

7. The coloring crayon according to claim 1, wherein the filler is at least one filler selected from the group consisting of: clay, kaolin, montmorillonite, bentonite, silica, mica, talc, calcium carbonate, magnesium silicate, aluminum silicate, and mixtures thereof.

8. The coloring crayon according to claim 1, wherein the crayon has an amount of filler that is in a range of 5% to 40% by weight, relative to the total weight of the crayon.

9. The coloring crayon according to claim 1, wherein the crayon has an amount of pigment that is in a range of 2% to 10% by weight, relative to the total weight of the crayon.

10. The coloring crayon according to claim 2, further comprising an additive, wherein the crayon has an amount of additive that is in the range of 0% to 6% by weight relative to the total weight of the crayon.

11. The coloring crayon according to claim 2, wherein the at least one wax is a mixture of paraffin and monocrystalline wax or a mixture of beeswax and monocrystalline wax.

12. The coloring crayon according to claim 3, wherein the range of the wax is 15% to 35%.

13. The coloring crayon according to claim 4, wherein the ethoxylated fatty alcohol is an ethoxylated cetyl and stearyl alcohol having the following formula I:

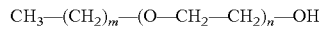

in which m=15 or 17 and n represents an integer in the range of 2 to 100.

14. The coloring crayon according to claim 5, wherein the range of the ethoxylated fatty alcohol is 25% to 45%.

15. The coloring crayon according to claim 6, wherein the range of the stearin is 17% to 25%.

16. The coloring crayon according to claim 7, wherein the filler is kaolin.

17. The coloring crayon according to claim 8, wherein the range of the filler is 14% to 17%.

18. The coloring crayon according to claim 9, wherein the range of the pigment is 2.5% to 5%.

19. The coloring crayon according to claim 10, wherein the range of the additive is 1% to 6%.

20. A method of fabricating a wax-based coloring crayon for marking a porous surface and a non-porous surface, the method comprising:
  heating at least one wax;
  combining an ethoxylated fatty alcohol and at least one pigment with the at least one wax to yield a mixture; and
  cooling the mixture to yield the wax-based coloring crayon,
  wherein the marking is dry erasable from the non-porous surface.

* * * * *